(12) United States Patent
Smulevitch

(10) Patent No.: US 11,701,650 B2
(45) Date of Patent: Jul. 18, 2023

(54) PIPETTE TIP CONTAINING ONE OR MORE BARRIERS

(71) Applicant: Sergey Smulevitch, Muncie, IN (US)

(72) Inventor: Sergey Smulevitch, Muncie, IN (US)

( * ) Notice: Subject to any disclaimer, the term of this patent is extended or adjusted under 35 U.S.C. 154(b) by 0 days.

(21) Appl. No.: 17/434,881

(22) PCT Filed: Feb. 20, 2020

(86) PCT No.: PCT/US2020/019023
§ 371 (c)(1),
(2) Date: Aug. 30, 2021

(87) PCT Pub. No.: WO2020/180497
PCT Pub. Date: Sep. 10, 2020

(65) Prior Publication Data
US 2022/0168726 A1    Jun. 2, 2022

Related U.S. Application Data

(60) Provisional application No. 62/814,377, filed on Mar. 6, 2019.

(51) Int. Cl.
*B01L 3/02* (2006.01)
*B01L 3/00* (2006.01)

(52) U.S. Cl.
CPC ............. *B01L 3/0275* (2013.01); *B01L 3/523* (2013.01); *B01L 2200/16* (2013.01);
(Continued)

(58) Field of Classification Search
CPC ............. A61B 10/0051; B01L 3/5082; B01L 2200/12; B01L 2300/0681;
(Continued)

(56) References Cited

U.S. PATENT DOCUMENTS

| 3,935,727 | A | 2/1976 | Knoche et al. |
| 5,041,088 | A | 8/1991 | Ritson et al. |

(Continued)

FOREIGN PATENT DOCUMENTS

| WO | WO-9729846 A1 * | 8/1997 | ............ B01L 3/0275 |
| WO | WO-2009118444 A1 * | 10/2009 | ......... A61B 10/0045 |
| WO | 2014026008 A1 | 2/2014 | |

OTHER PUBLICATIONS

International Search Report, International Searching Authority, International Patent Application No. PCT/US20/19023, dated May 14, 2020, 2 pages.

(Continued)

*Primary Examiner* — Matthew D Krcha
*Assistant Examiner* — Jacqueline Brazin
(74) *Attorney, Agent, or Firm* — Taft Stettinius & Hollister LLP

(57) ABSTRACT

A pipette tip according to certain embodiments includes a proximal end, a distal end, and a reagent chamber. The proximal end is dimensioned to fit on an end of a pipettor, and includes a proximal end opening. The distal end includes a distal end opening. The reagent chamber has a reagent composition disposed therein. The reagent chamber is defined at least in part by a proximal barrier and a distal barrier. The reagent composition is operable to pass through the distal end opening upon rupturing of the distal barrier.

13 Claims, 4 Drawing Sheets

(52) U.S. Cl.
CPC .............. *B01L 2300/0672* (2013.01); *B01L 2300/0681* (2013.01); *B01L 2300/0832* (2013.01)

(58) Field of Classification Search
CPC .... B01L 2300/0832; B01L 2300/0848; C12M 3/06; C12M 1/40; C12M 3/00
USPC ....................................................... 600/576
See application file for complete search history.

(56) References Cited

U.S. PATENT DOCUMENTS

| | | | |
|---|---|---|---|
| 2002/0009809 A1* | 1/2002 | Brewer ................. | B01L 3/0275 436/66 |
| 2003/0171720 A1* | 9/2003 | Pizolato .................. | A61M 5/28 604/212 |
| 2010/0081209 A1 | 4/2010 | Brewer | |
| 2012/0071643 A1* | 3/2012 | Helfer ................... | B01L 3/0275 536/25.4 |
| 2016/0238626 A1 | 8/2016 | Bonzon et al. | |
| 2018/0093263 A1 | 4/2018 | Bonzon et al. | |

OTHER PUBLICATIONS

Written Opinion, International Searching Authority, International Patent Application No. PCT/US20/19023, dated May 14, 2020, 5 pages.

* cited by examiner

PIPETTE TIP CONTAINING ONE OR MORE BARRIERS

CROSS-REFERENCE TO RELATED APPLICATIONS

The present application is a U.S. National Phase of International PCT Application No. PCT/US2020/019023, which was filed on Feb. 20, 2020, and which claims the benefit of priority to U.S. Provisional Patent Application No. 62/814,377, filed Mar. 6, 2019, the contents of which are incorporated by reference herein in their entirety.

TECHNICAL FIELD

The present disclosure relates to a pipette tip and method of use thereof that delivers a reagent to samples in preparation for subsequent reaction and/or analysis. The disclosed embodiments may eliminate the need to prepare, store, and handle reagents prior to their delivery to a sample.

BACKGROUND ART

Numerous pipette tips exist to aid in sample preparation for subsequent biological and chemical analysis. More recent inventions involve pipette tips that have integral sample purification features, such as the RapidTip®, which specifically functions to purify PCR samples for subsequent analysis. However, there exists a need for a pipette tip that reduces the need for or eliminates the requirement of preparation, storage, and handling of reagents prior to delivery into a reaction vessel.

BRIEF SUMMARY

A pipette tip according to certain embodiments includes a proximal end, a distal end, and a reagent chamber. The proximal end is dimensioned to fit on an end of a pipettor, and includes a proximal end opening. The distal end includes a distal end opening. The reagent chamber has a reagent composition disposed therein. The reagent chamber is defined at least in part by a proximal barrier and a distal barrier. The reagent composition is operable to pass through the distal end opening upon rupturing of the proximal barrier and the distal barrier.

DETAILED DESCRIPTION OF INVENTION

Figure 1:
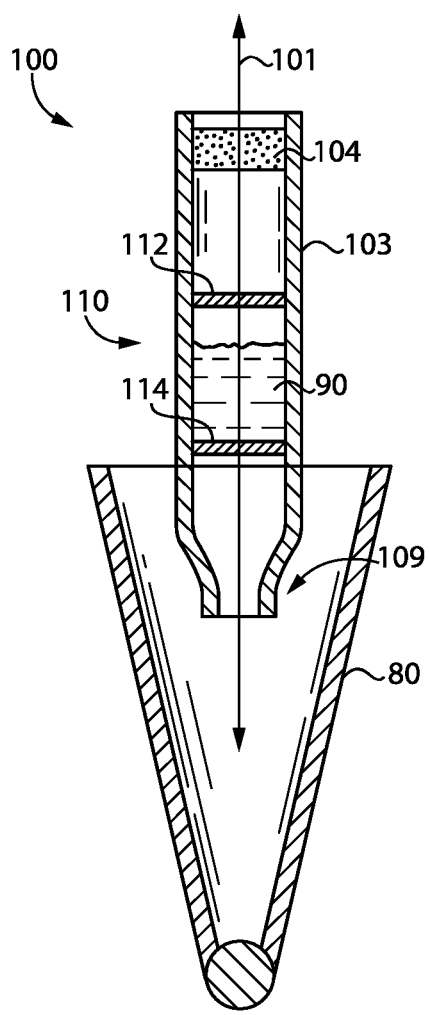
FIG. 1 is a cross-sectional view of a pipette tip according to certain embodiments, wherein a reagent composition is disposed within a reagent chamber.

It should be understood that the relative dimensions and shapes shown in the drawings are for illustration purposes only and will vary from those shown in the drawings in most actual products. The relative dimensions and shapes are for purposes of a clear illustration and are not considered to be limiting.

FIG. 1 is a cross-sectional view of one embodiment of a pipette tip 100 according to the present application, wherein a reagent composition 90 is present in a reagent chamber 110 of the pipette tip 100. The pipette tip 100 generally extends along a longitudinal axis 101 along which the reagent composition 90 will flow into a vessel 80, which may, for example, be formed of plastic or glass. The longitudinal axis 101 extends along and defines a proximal direction (upwards in FIG. 1) and a distal direction (downwards in FIG. 1). The proximal direction may alternatively be referred to as the upstream direction, and the distal direction may alternatively be referred to as the downstream direction. As described herein, the reagent chamber 110 is defined in part by a proximal barrier 112 and in part by a distal barrier 114.

A circumferential wall 103 partially defines the pipette tip 100, and may, for example, be formed of plastic or glass. The pipette tip 100 has a proximal end 108 configured for mounting to the end of a pipettor 70 (FIG. 5), and an opposite distal end 109. The proximal end 108 has a proximal end opening 108', and the distal end 109 has a distal end opening 109'. In certain embodiments, the distal end 109 may have a smaller cross-section than the rest of pipette tip 100. The main part of the sidewall 103 can have a cylindrical shape as shown in FIG. 1, or can have a slightly conical (truncated conical or frustoconical) shape. The pipette tip 100 may be provided with an aerosol barrier 104, which may be positioned upstream or proximally of the proximal barrier 112. In the illustrated form, the barriers 112, 114 are provided as pressure-sensitive barriers that lose structural integrity when increased pressure is applied by a pipette to one side of the pressure-sensitive barriers 112, 114. As discussed below, when the pressure-sensitive barrier loses structural integrity, openings 113, 115 are formed in the barriers 112, 114.

Figure 2:
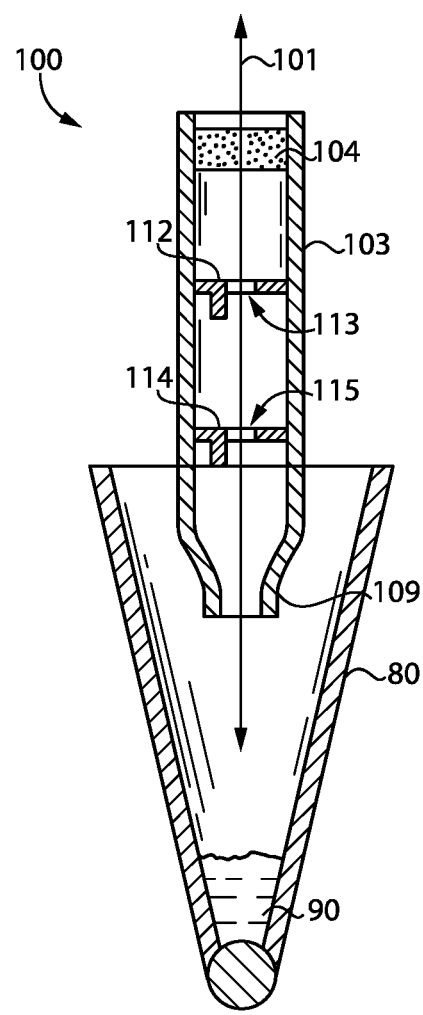
FIG. 2 is a cross-sectional view of the pipette tip illustrated in FIG. 1, wherein a barrier of the reagent chamber has been ruptured and the reagent composition has passed into a vessel.

FIG. 2 shows a situation where openings 113, 115 (either of random irregular shape or predetermined shape) are formed in the pressure barriers 112, 114. A portion of each barrier 112, 114 (still attached to the rest of the barrier) is illustrated in FIG. 2 as hanging down from the openings 113, 115 adjacent to the openings 113, 115. These barriers 112, 114 can take many different forms but can be as simple as a thin plastic layer that has sufficient structural integrity to hold a reagent composition 90 during placement in the pipette and during subsequent transportation and handling but which can be ruptured by applying typical pressures (above one atmosphere) provided by an automated pipettor, or even by mouth. The reagent composition 90 includes at least one reagent, and may be provided as a mixture of reagents. The reagent composition 90 can be of any physical form that can be delivered by gravity or slight pressure such as a liquid or powder. As noted above, a reagent chamber 110 is formed between the pressure-sensitive barriers 112, 114 and holds the reagent composition 90 until the barriers 112, 114 are ruptured. As used herein, the term "ruptured" indicates a loss of structural integrity or otherwise creating an opening that results in a lack of airtightness for the reagent chamber, thereby enabling the reagent composition 90 to flow out of the pipette tip. "Rupturing" may, for example, include piercing, opening, breaking, disintegration, or another form of loss of airtightness.

In FIG. 2, the pipette tip 100 is illustrated after the pressure-sensitive membranes 112, 114 have lost integrity, thereby delivering the reagent composition 90 into the vessel 80. As a result, the reagent chamber 110 is empty. The pressure-sensitive barrier(s) 112, 114 can lose integrity by simple rupture caused by a relative change in pressure on between the upper and lower side of the pressure-sensitive barrier 112/114. In this case, an irregular opening or hole 113/115 would be created when the pressure-sensitive barrier 112/114 ruptures due to the pressure differential. Alternatively, the pressure-sensitive barrier 112/114 could be pre-formed with a weakened line or lines 117 (FIG. 3) that would rupture in response to the relative change in pressure between the upper and lower sides of the pressure-sensitive barrier 112/114. In such a situation, the opening 113/115 would be defined by the weakened line(s) 117 to define an opening such as a "lid" or opening of predefined shape.

Figure 3:
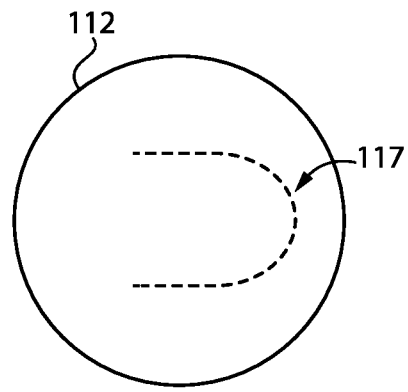
FIG. 3 is a plan view of a pressure-sensitive membrane according to certain embodiments.
Figure 4:
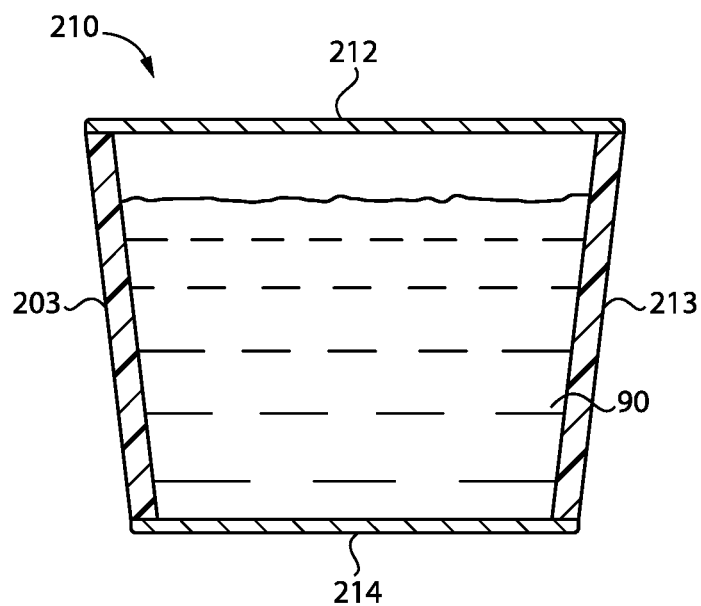
FIG. 4 is a cross-sectional view of a regent chamber that can be manufactured and filled with at least one reagent before placing it in a pipette tip.

With additional reference to FIG. 4, illustrated therein is a cross-sectional view of a reagent chamber 210 that can be manufactured and filled with a reagent composition 90 including at least one reagent before placing it in a pipette tip, such as the pipette tip 100. In this embodiment, the reagent chamber 210 comprises plastic walls 203, 213, which will conform generally (or be capable of conforming to) the inner side of the wall 103 of the pipette tip 100, at a location between the two ends of the tip 100. In FIG. 3, the side wall(s) 213 are in the shape of a truncated cone and will fit snugly into a pipette that has an inner side wall with a similar shape over at least part of the inner wall. Secured to each end of the plastic walls are pressure-sensitive barriers, 212 and 214, which retain the reagent composition 90 within the chamber 210.

In the embodiment shown in FIGS. 1-3, the pressure-sensitive barriers 112, 114 can be secured to the inner wall of the pipette tip 100 by conventional techniques for a given product such as by gluing, plastic welding, or the like. Likewise, in the embodiment shown in FIG. 4, the pressure-sensitive barriers 212, 214 can be secured to the upper and lower ends of the plastic walls 203 by similar techniques, for example after filling the chamber 210 with suitable reagent composition(s) 90. The filled chamber 210 may then be placed in a pipette and suitably secured.

Figure 5:
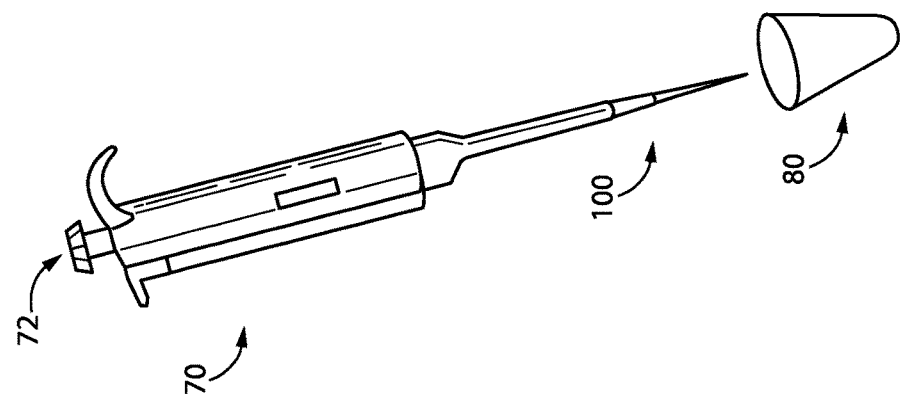
FIG. 5 is a perspective illustration of a system according to certain embodiments.

With additional reference to FIG. 5, in certain embodiments, the use of the pipette tip 100 disclosed in the present application involves securing the proximal side of a pipette tip 100 that contains a reagent composition 90 in a reagent chamber 110 to a pipettor 70 and generating a tight seal. The secured, reagent-containing pipette tip is placed in a sample vessel 80. The plunger 72 on the pipettor 70 is pressed down, thereby generating a higher pressure on the proximal or upstream side of the pressure-sensitive barrier 112. This causes both of the pressure-sensitive barriers 112, 114 to lose structural integrity, thereby delivering the reagent composition 90 stored in the reagent chamber 110 directly into a sample vessel 80. Subsequent to delivery of the reagent composition 90 into the sample vessel 80, the pipette tip 110 may be further used to mix the reagent composition 90 and sample by placing the distal end 109 of the pipette tip 100 in the vessel 80 containing the reagent-sample solution and pipetting up and down, as one would with a typical pipette tip.

Although the embodiments shown in the drawings include two pressure-sensitive barriers, the upper barrier could be eliminated if the reagent composition is a non-liquid composition such as a powder. In such embodiments, the aerosol barrier could function to keep the reagent composition within the pipette tip.

Figure 6:
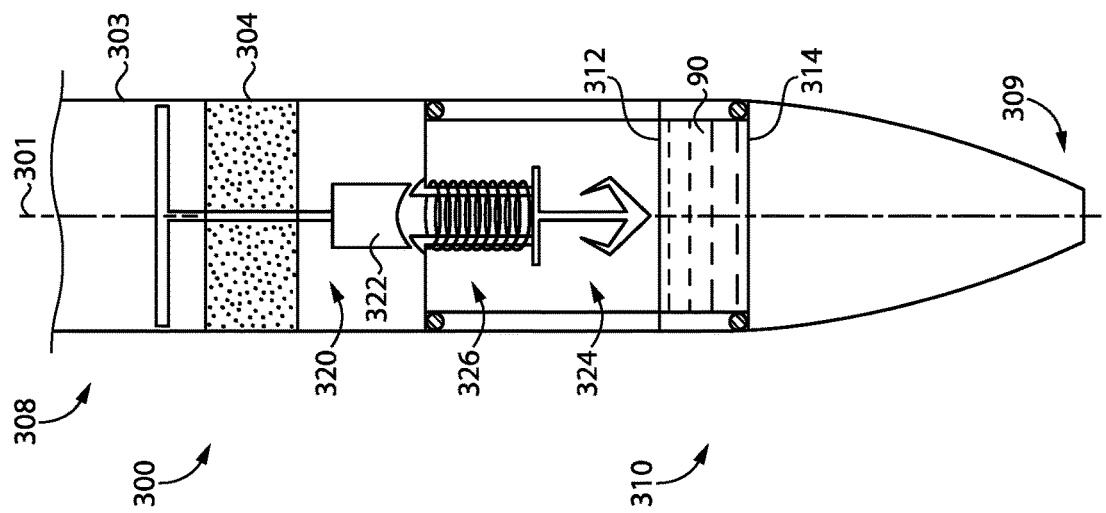
FIG. 6 is a cross-sectional view of a pipette tip according to certain embodiments, wherein the pipette tip includes a rupture mechanism.

With additional reference to FIG. 6, illustrated therein is a pipette tip 300 according to certain embodiments. As with the above-described pipette tip 100, the pipette tip 300 extends along a longitudinal axis 301 between a proximal end 308 and a distal end 309, is defined in part by a circumferential sidewall 303, and may include an aerosol barrier 304. The pipette tip 300 further includes a reagent chamber 310 that, in the illustrated form, is defined in part by a proximal barrier 312 and a distal barrier 314. The pipette tip 300 further includes a rupture mechanism 320 configured to rupture the barriers 312, 314 to release the reagent composition 90 through the opening in the distal end 309 of the pipette tip 300.

In the illustrated form, the plunger 322 and the lance 324 are formed as separate components; in other embodiments, the plunger 322 and lance 324 may be coupled to one another or formed as a single-piece construction. In certain embodiments, the reagent chamber 310 and the rupture mechanism 320 may be provided together with the pipette tip 300. In other embodiments, the reagent chamber 310 and rupture mechanism 320 may be provided as standalone units configured for insertion in a pipette tip in a manner analogous to that described above with reference to the reagent chamber 210.

The rupture mechanism 320 generally includes a plunger 322 extending from the proximal end portion of the pipette tip 300 toward the reagent chamber 310, and a lance 324 facing the reagent chamber 310, and may further include a spring 326 biasing the plunger 322 in the proximal direction (upward in FIG. 6). Upon application of pressure or force to the plunger 322, the plunger 322 distally drives the lance 324 through the barriers 312, 314, thereby rupturing the barriers 312, 314 and releasing the reagent composition 90 from the reagent chamber 310. The plunger 322 may, for example, be urged or forced distally by insertion of a pipette nozzle into the pipette tip 300, or by depressing the pipette plunger 72 after the pipette tip 300 has been mounted to the pipettor 70. It is also contemplated that the rupture mechanism 320 may be actuated in another manner. As one example, the rupture mechanism 320 may include an electromechanical actuator that actuates the rupture mechanism 320 in response to an electric signal, such as a radio signal.

Figure 7:
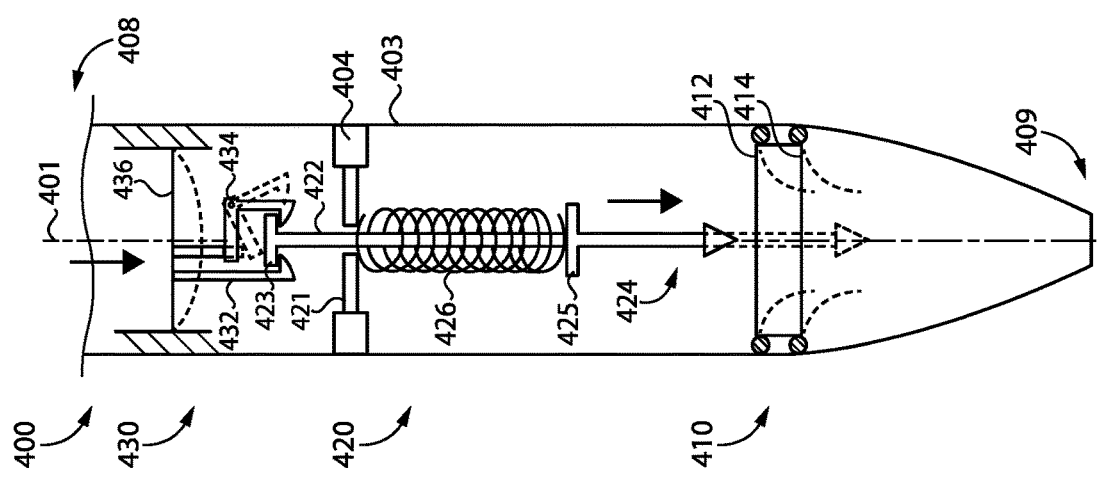
FIG. 7 is a cross-sectional view of a pipette tip according to certain embodiments, wherein the pipette tip includes a rupture mechanism and a catch mechanism.

With additional reference to FIG. 7, illustrated therein is a pipette tip 400 according to certain embodiments. As with the above-described pipette tip 100, the pipette tip 400 extends along a longitudinal axis 401 between a proximal end 408 and a distal end 409, is defined in part by a circumferential sidewall 403, and may include an aerosol barrier 404. The pipette tip 400 further includes a reagent chamber 410 that, in the illustrated form, is defined in part by a proximal barrier 412 and a distal barrier 414. The pipette tip 400 further includes a rupture mechanism 420 configured to rupture the barriers 412, 414 to release the reagent composition 90 through the distal end 409 of the pipette tip 400. As described herein, the pipette tip 400 further includes a catch mechanism 430 configured to selectively retain the rupture mechanism 420 in a loaded state.

The rupture mechanism 420 includes a plunger 422 extending from the proximal end portion of the pipette tip 400 toward the reagent chamber 410, and a lance 424 formed on a distal end of the plunger 422 and facing the reagent chamber 410. A spring 426 is compressed between a wall 421 coupled to the sidewall 403 and a shoulder 425 formed near the lance 424, thereby urging the plunger 422 and the lance 424 in the distal direction. However, the plunger 422 is retained in a proximal or retracted position by the catch mechanism 430, such that the spring 426 remains compressed and the rupture mechanism 420 remains loaded.

The illustrated catch mechanism 430 generally includes a first catch arm 432 and a second catch arm 434, one or both of which may be mounted to a catch barrier 436. The arms 432, 434 are positioned such that in the natural state of the catch mechanism 430, the arms 432, 434 engage the plunger 422 and retain the rupture mechanism 420 in its loaded state. When the catch barrier 436 is depressed (e.g., by insertion of a pipette nozzle into the pipette tip 400, or by depressing the pipette plunger 72 after the pipette tip 400 has been mounted to the pipettor 70), the second arm 434 moves (e.g., pivots) out of engagement with the plunger 424. With the plunger 424 released, the spring 426 releases its stored energy and drives the lance 426 through the barriers 412, 414, thereby releasing the reagent composition 90 from the chamber 410. The plunger 422 may include a head 423 that engages the wall 421 to limit distal movement of the plunger 422 to thereby prevent the lance 424 from exiting via the distal end 409.

In the illustrated form, the catch mechanism 430 releases the rupture mechanism 420 when mechanically actuated. It is also contemplated that the catch mechanism 430 may be actuated in another manner. As one example, the catch mechanism 430 may include an electromechanical actuator that releases the rupture mechanism 420 in response to an electric signal, such as a radio signal.

Figure 8:
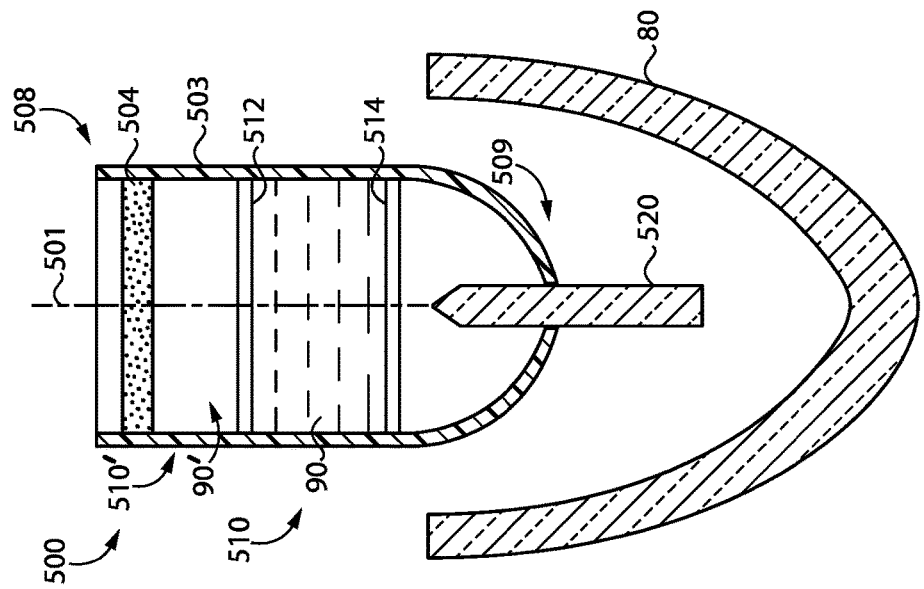
FIG. 8 is a cross-sectional view of a pipette tip according to certain embodiments in combination with a vessel according to certain embodiments.

With additional reference to FIG. 8, illustrated therein is a pipette tip 500 according to certain embodiments. As with the above-described pipette tip 100, the pipette tip 500 extends along a longitudinal axis 501 between a proximal end 508 and a distal end 509, is defined in part by a circumferential sidewall 503 that extends to a distal end 509 of the tip 500, and may include an aerosol barrier 504. The pipette tip 500 further includes a reagent chamber 510 that, in the illustrated form, is defined in part by a proximal barrier 512 and a distal barrier 514. In other embodiments, such as those in which the reagent composition 90 is provided as a powdered reagent composition, the proximal end of the reagent chamber 510 may be defined by an aerosol barrier 504.

In the illustrated form, the pipette tip 500 further includes a rupture mechanism in the form of a movable lance 520. The lance 520 is assembled in the pipette tip 500 distally of the reagent chamber 510 and projects from the opening in the distal end 509 of the tip 500. As the pipette tip 500 is lowered into the vessel 80, the bottom surface of the vessel 80 drives the lance 520 upward, thereby rupturing the barriers 512, 514 and releasing the reagent composition 90 into the vessel 80. In certain forms, a length of the lance 82 may be insufficient to rupture the aerosol barrier 504 to ensure that the aerosol barrier 504 remains intact.

In certain embodiments, the pipette tip 500 may include a second reagent chamber 510' having a second reagent composition 90' contained therein. In the illustrated form, the second reagent chamber 510' is defined by the proximal barrier 512 and the aerosol barrier 503 such that the second reagent composition 90' is released when the proximal barrier 512 is ruptured. It is also contemplated that the second reagent chamber 510' may be defined by another form of barrier, such as those described above. Additionally, it should be appreciated that a second reagent chamber along the lines of the reagent chamber 510' may be provided to any of the embodiments described herein.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A pipette tip comprising:
   a proximal end dimensioned to fit on an end of a pipettor, the proximal end including a proximal end opening;
   a distal end including a distal end opening;
   a reagent chamber having a reagent composition disposed therein, wherein the reagent chamber is defined at least in part by a proximal barrier and a distal barrier;
   a rupture mechanism comprising a lance and a spring, wherein the lance is configured to rupture the distal barrier when moved from a first position to a second position, and wherein the spring urges the lance toward the second position; and
   a catch selectively retaining the lance in the first position;
   wherein the reagent composition is operable to pass through the distal end opening upon rupturing of the distal barrier; and
   wherein the distal barrier prevents the reagent composition from passing through the distal end opening prior to rupturing of the distal barrier.

2. The pipette tip of claim 1, wherein the distal barrier comprises a first pressure-sensitive membrane configured to rupture upon application of a predetermined pressure differential.

3. The pipette tip of claim 2, wherein the first pressure-sensitive membrane comprises one or more lines along which the first pressure-sensitive membrane is configured to rupture.

4. The pipette tip of claim 2, wherein the proximal barrier comprises a second pressure-sensitive membrane configured to rupture upon application of the predetermined pressure differential.

5. The pipette tip of claim 1, further comprising a second reagent chamber defined by an additional barrier and one of the proximal barrier or the distal barrier, wherein the second reagent chamber has a second reagent composition disposed therein, and wherein the reagent composition and the second reagent composition are different compositions.

6. The pipette tip of claim 1, wherein the reagent composition is in solid, liquid, or suspension form.

7. The pipette tip of claim 1, wherein the catch is operable to release the lance to thereby cause the spring to drive the lance in the distal direction, thereby causing the lance to rupture the distal barrier.

8. A reagent delivery system comprising the pipette tip according to claim 1, and a pressure source connected with said pipette tip, wherein said pressure source is operable to rupture the distal barrier.

9. A reagent delivery method comprising:
changing the pressure on the proximal side of the distal barrier of the pipette tip of claim 1 to cause the distal barrier to lose structural integrity, thereby rupturing the distal barrier; and
allowing or causing the reagent composition to pass from within the pipette tip and through the distal end opening.

10. A method, comprising:
attaching a proximal end of a pipette tip to a pipettor, wherein the pipette tip comprises a reagent composition and a barrier retaining the reagent composition within the pipette tip; and
rupturing the barrier, thereby causing the reagent composition to pass through a distal end of the pipette tip and into a vessel;
wherein rupturing the barrier comprises actuating the pipettor; and
wherein the pipette tip further comprises a movable lance, and wherein actuating the pipettor releases a catch retaining the lance in a first position, thereby enabling a spring to cause movement of the lance to a second position such that the lance pierces the barrier.

11. A method, comprising: attaching a proximal end of a pipette tip to a pipettor, wherein the pipette tip comprises a reagent composition and a barrier retaining the reagent composition within the pipette tip; and rupturing the barrier, thereby causing the reagent composition to pass through a distal end of the pipette tip and into a vessel;
wherein rupturing the barrier comprises releasing a catch to thereby cause a spring to push a lance of the pipette tip in a proximal direction such that the lance pierces the barrier.

12. A pipette tip comprising:
a proximal end dimensioned to fit on an end of a pipettor, the proximal end including a proximal end opening;
a distal end including a distal end opening; and
a reagent chamber having a reagent composition disposed therein, wherein the reagent chamber is defined at least in part by a proximal barrier and a distal barrier;
a rupture mechanism configured to rupture the proximal barrier and the distal barrier, wherein the rupture mechanism comprises a lance and a spring urging the lance to rupture the proximal barrier and the distal barrier;
wherein the reagent composition is operable to pass through the distal end opening upon rupturing of the proximal barrier and the distal barrier.

13. The pipette tip of claim 12, further comprising a catch selectively retaining the lance in a proximal position.

* * * * *